United States Patent Office 2,926,200
Patented Feb. 23, 1960

2,926,200

INHIBITING POLYMERIZATION OF DICHLOROSTYRENES WITH AMINO COMPOUNDS

Roger F. Monroe, Midland, Mich., assignor to The Dow Chemical Company, Midland, Mich., a corporation of Delaware No Drawing. Application May 2, 1957
Serial No. 656,482

8 Claims. (Cl. 260—650)

This invention concerns the polymerization inhibition of isomeric dichlorostyrenes by means of substituted amines of the group consisting of polyalkylene polyamines, diisopropyl amine, N,N-dimethyl-1-ethynylcyclohexylamine, diisopropyl-N-allyl amine and diisopropyl-N-propargyl amine.

It is well known that the isomeric dichlorostyrenes, except 2,6-dichlorostyrene, have a polymerization rate varying between 100 and 200 times that of styrene. For this reason, it has been difficult to store or to ship such isomeric dichlorostyrenes without their undergoing polymerization. It has been customary to pack shipments of such dichlorostyrenes in Dry Ice to retard polymerization. The known polymerization inhibitors in amounts which have been found useful for stabilizing styrene monomer against polymerization have been found to be ineffective for longer than about one week with polymerizable isomeric dichlorostyrenes and their mixtures when kept at about 25° C.

It has now been discovered, in accordance with this invention, that such isomeric dichlorostyrenes can be stabilized against room temperature polymerization by incorporating therewith a substituted amine of the group consisting of polyalkylene polyamines, such as polyethylene polyamines and polypropylene polyamines having up to five alkylene units, including the triamines, tetramines, pentamines, hexamines, diisopropyl amine, N,N-dimethyl-1-ethynylcyclohexylamine, diisopropyl-N-allyl amine and diisopropyl-N-propargylamine. The amount of substituted amine can be varied, provided that a minimum of at least 0.05 percent by weight, dichlorostyrene basis, is present. The preferred range is between 0.1 and 0.5 percent by weight. Larger amounts than 0.5 percent by weight are generally unnecessary.

In practice, one or more of the indicated substituted amines is dissolved in the dichlorostyrene to provide at least 0.05 percent by weight thereof. The treated dichlorostyrene is thereby stabilized for between one month and one year at room temperature. Polymerization inhibition is determined by withdrawing a one drop sample of such dichlorostyrene and adding it to a large excess, about 20–25 ml., of methanol. Polymer formation shows up as a cloudiness or precipitate, since dichlorostyrene polymers are insoluble in methanol.

The following table indicates results obtained when various proportions of the indicated substituted amines were added to 100 g. batches of the indicated dichlorostyrenes.

Table

| Monomer | Inhibitor and Concentration, Wt. Percent of Monomer | Stability at 25° C. |
|---|---|---|
| Mixed DCS:[1] 44% 2,4-, 32% 2,5-, 15% 2,3-, 6% 2,6-, 2-3% 3,4-DCS. | 0.1 TETA [2] | No polymer after 6 mos.[8] |
| Do | 0.05 TETA | No polymer after 1 mo.[8] |
| Do | 0.2 TEPA [3] | Do. |
| Do | 0.05 TEPA | Do. |
| Do | 0.2 N,N-DMEC [4] | Do. |
| Do | 0.05 DIA [5] | Do. |
| Do | 0.05 DINAA [6] | Do. |
| Do | 0.05 DINPA [7] | Do. |
| Do | 0 | Syrupy in 24 hrs. (10–15% conversion). |
| 2,5-DCS | 0.2 TETA | No polymer after 6 mos.[8] |

[1] Dichlorostyrene.
[2] Triethylene tetramine.
[3] Tetraethylene pentamine.
[4] N,N-dimethyl-1-ethynylcyclohexylamine.
[5] Diisopropyl amine.
[6] Diisopropyl-N-allyl amine.
[7] Diisopropyl-N-propargyl amine.
[8] Test continuing.

Similar advantageous results are obtained when diethylene triamine, pentaethylene hexamine, dipropylene triamine and pentapropylene hexamine are substituted for the given amines in amounts ranging between 0.05 and 0.5 percent. Mixtures of two or more of such substituted amines in amounts ranging between 0.05 and 0.5 percent are equally useful.

What is claimed is:

1. A dichlorostyrene monomer normally subject to room temperature polymerization containing as a polymerization inhibitor at least 0.05 percent by weight, monomer basis, of at least one substituted amine of the group consisting of polyalkylene polyamines having up to 5 alkylene units of the group consisting of ethylene and propylene, diisopropyl amine, N,N-dimethyl-1-ethynylcyclohexylamine, diisopropyl-N-allyl amine and diisopropyl-N-propargyl amine.

2. The product of claim 1 wherein the content of substituted amine ranges between 0.05 and 0.5 percent by weight.

3. The product of claim 2 wherein the dichlorosytrene monomer is an isomeric mixture and the substituted amine is triethylene tetramine.

4. The product of claim 2 wherein the substituted amine is tetraethylene pentamine.

5. The product of claim 2 wherein the substituted amine is N,N-dimethyl-1-ethynylcyclohexylamine.

6. The product of claim 2 wherein the substituted amine is diisopropyl-N-propargyl amine.

7. The product of claim 2 wherein the substituted amine is diisopropyl amine.

8. A process for inhibiting the polymerization of a monomeric dichlorostyrene normally subject to room temperature polymerization, which process comprises adding to said monomeric dichlorostyrene between 0.05 and 0.5 percent by weight, monomer basis, of at least one substituted amine of the group consisting of polyalkylene polyamines having up to 5 alkylene units of the group consisting of ethylene and propylene, diisopropyl amine, N,N-dimethyl-1-ethynylcyclohexylamine, diisopropyl-N-allyl amine and diisopropyl-N-propargyl amine.

References Cited in the file of this patent

UNITED STATES PATENTS

| | | |
|---|---|---|
| 2,013,941 | Young et al. | Sept. 10, 1935 |
| 2,561,916 | Erickson | July 24, 1951 |

OTHER REFERENCES

Moureu et al.: "Comptes, rend.," vol. 183, pp. 408–12 (1926).

Boundy-Boyer: "Styrene," pp. 21–22, 254–5 (1952).